Aug. 24, 1943.  H. J. GALEY  2,327,883
SKELETON MOLD
Filed Jan. 16, 1940
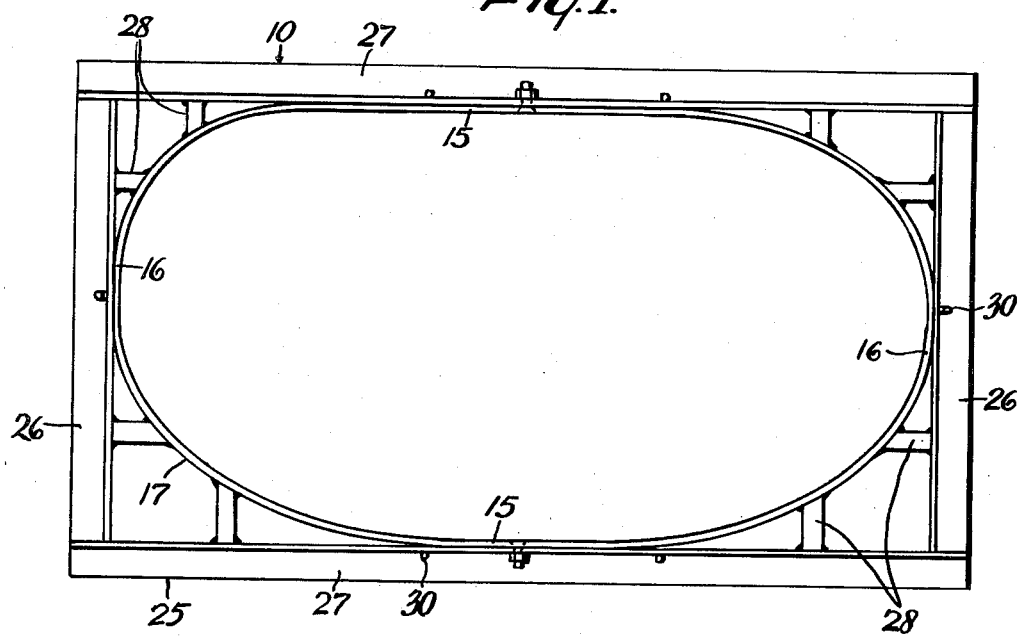
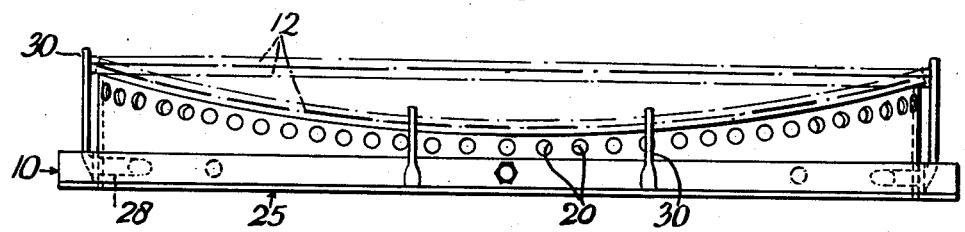
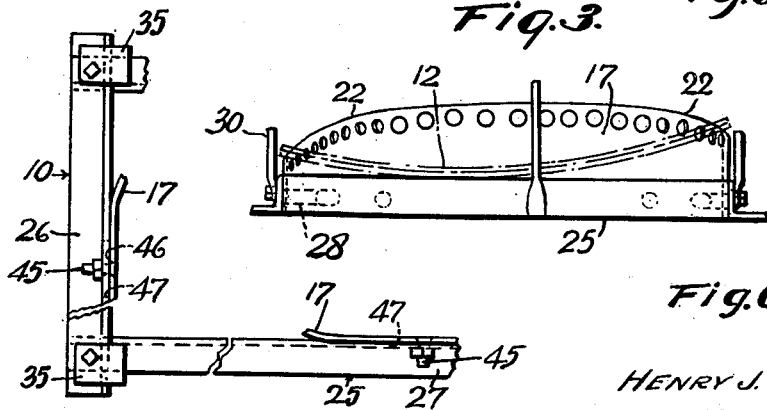
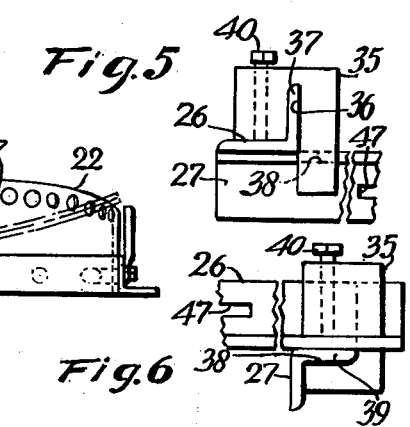
INVENTOR
HENRY J. GALEY
BY Olew E. Bee
ATTORNEY.

Patented Aug. 24, 1943

2,327,883

UNITED STATES PATENT OFFICE 2,327,883

SKELETON MOLD

Henry J. Galey, Tarentum, Pa., assignor to Pittsburgh Plate Glass Company, Allegheny County, Pa., a corporation of Pennsylvania Application January 16, 1940, Serial No. 314,071

3 Claims. (Cl. 49—67)

This invention relates to devices for supporting sheet glass during the treatment thereof and it has particular relation to a structure peculiarly adapted to support sheet glass while the latter is being subjected to heat treatment, such as that involved in bending the glass.

One object of the invention is to provide an improved supporting frame designed to obviate marring or streaking of the sheet glass treated thereon.

Another object of the invention is to provide a supporting frame for gauging the bending of sheet glass and at the same time providing areas adjacent the location of the glass body free from structural elements which might otherwise cause the marring thereof.

Another object of the invention is to provide a glass supporting mold and frame structure having demountable elements capable of being used in connection with various sizes of molding elements.

In my copending application, Serial No. 283,776, filed July 11, 1939, which issued as Patent No. 2,261,023, Oct. 28, 1941, there is proposed an improved construction of skeleton mold upon which sheet glass can be supported and heated until it bends under the influence of its own weight to assume a contour determined by the upper mold edges which are curved. This type of mold is primarily composed of upright wall sections braced transversely by means of bars or rods which maintain the mold against warping or other distortion.

While this prior structure serves satisfactorily in practicing the method of bending sheet glass to form compound, or other curvatures, it has been found that inside transverse bracing members extending across the mold may be objectionable. During the treatment of the sheet glass, which is heated to softening temperature, the surface of the glass under such conditions is relatively sensitive and becomes streaked or marred as a result of the proximity of these bracing members. Although this kind of marring is visible only when the glass is viewed from certain angles, it is a factor which has commercial disadvantages.

The invention herein described is directed to a construction of a skeleton mold which has all of the required attributes of strength and proper mode of operation during the treatment of glass and, at the same time, obviates the formation of any lines or other marring which might not be apparent at the time of formation of the curvatures, but which might otherwise appear and be objectionable later. This improved construction is achieved by providing an upright molding wall of proper contour for receiving sheet glass. The upright molding wall is surrounded by a rigid frame properly secured thereto to hold the entire assembly rigidly by means of bracing members extending from the inner sides of the surrounding frame members to the outer side of the mold wall without any of the structural elements projecting inside the wall.

In the drawing:

Figure 1 is a plan of a skeleton mold constructed according to the invention; Fig. 2 is a side elevation of the mold, together with diagrammatic illustration of sheet glass supported thereon; Fig. 3 is an end elevation of the mold; Fig. 4 is a fragmentary plan of another form of mold including frame members capable of being disassembled; Fig. 5 is a fragmentary side elevation, on a larger scale, of adjustable portions of the demountable mold structure; and Fig. 6 is a fragmentary end elevation of the structure shown in Fig. 5.

In practicing the invention, a skeleton mold structure 10 is provided for supporting one or more elongate glass sheets 12 in a substantially horizontal position, as indicated in the upper broken lines in Fig. 2. The glass is bent, or otherwise treated, in the manner described in the copending application referred to above. This mold structure includes elongate sheet metal side walls 15 which are integral with sheet metal end walls 16 and these walls merge into one another to form a continuous wall structure 17 opening completely at both top and bottom. Although the mold wall is a continuous structure, the sides and ends thereof are well defined and are termed side walls and end walls for convenience in referring to them and differentiating them.

The upper edges of the side walls 15 are curved to provide upwardly facing molding surfaces upon which the sheet glass rests after it bends and sags under the influence of its own weight when predetermined heat is applied to reduce the glass to softening temperature. The end walls 16 are provided with additional upwardly facing curved edges which correspond substantially to each other and merge into the upper edges of the side walls. In order to provide for air circulation and to reduce heat transmission between the glass and supporting wall portions, the upper marginal portions of the mold walls are provided with a series of openings 20 running entirely around the continuous wall sections at a distance slightly spaced from the glass supporting edges thereof.

At the upper corner portion of the continuous mold wall there are well defined areas or points 22 from which more or less sharp curvatures of the upper glass supporting edges commence. The remainder of the glass between these areas or points, and traversing the opening area inside the mold, is free to bend when heated to a softening temperature and is controlled in the manner specified in the copending application above identified.

A supporting frame 25 surrounds the mold body which extends upwardly therefrom into turret-like formation, and the frame is composed of end and side angle members 26 and 27, respectively, or like structural elements. These members are welded or otherwise rigidly connected to the outer sides of the mold body to provide a rigid structure for properly supporting such body. The supporting frame is relatively narrow along horizontal planes and for convenience the frame members 26 and 27 constituting the main portion of the bracing are arranged in substantially polygonal or rectangular shape. Suitable bracing members 28 are welded at spaced locations upon the inner sides of the frame members 26 and 27 and to the outer side of the mold wall.

A number of upright guides 30 are secured at spaced intervals on the end and side angle members 26 and 27 and project above the mold edges in such positions as to properly center the sheet glass preparatory to bending or other treatment to which the glass supported thereon is to be subjected.

In the form of the invention shown in Figs. 4 to 6, the end angle members 26 are superposed relative to the side angle members 27 and a clamping block 35 is provided at each corner portion of the frame for the purpose of holding the frame members together in adjustable and rigid relation. In this arrangement, each block 35 has a vertical notch 36 in which a vertical flange 37 of an end angle member 26 is fitted. Likewise, each block has a horizontal notch 38 disposed substantially at right angles to the notch 36 and into which a horizontal flange 39 of a side angle member 27 is fitted. A bolt 40 screw-threaded through each block 35 normally engages at its inner end against the angle member 26 and can be tightened thereagainst for the purpose of rigidly securing the block and angle members at each corner of the frame structure in rigid relation. Upon tightening each bolt 40, the block in response thereto is also tightened upon each adjacent angle member.

From this arrangement it is apparent that the size of the frame can be varied and the different sizes of mold bodies or turrets can be employed with a single bracing and supporting frame structure. Adjustability of the frame and securing thereof to various sizes of molding wall body 17 is facilitated by employing side and end fastening devices 45, such as conventional bolts, which are, either permanently or removably, mounted in the wall of the mold body in openings 46 formed therein. These fastening devices extend through substantially horizontally disposed slots 47 formed in the side and end angle members 26 and 27. After the mold body has been properly set and adjusted in the demountable frame members, the fastening devices 45 are tightened and the clamping block bolts 40 are also set and tightened to complete the rigid mold structure. In this form the assembly is ready to receive the sheet glass to be treated in the manner described in the application above referred to, or in any other manner of treatment to which the features described are applicable.

Although practical structure in which the invention has been incorporated has been shown and described in detail, it will be apparent to those skilled in the art that the invention is not so limited, but that various changes can be made therein without departing from the spirit of the invention or from the scope of the appended claims.

I claim:

1. A glass supporting and forming mold comprising a continuous upright wall body having a curved glass receiving upper edge and being free from inner transverse and longitudinal structural elements, side frame members disposed at opposite outer sides of the wall body along the lower portions thereof in such position that the wall projects thereabove, end frames members disposed across the end portions of the side frame members and opposite end portions of the wall body, devices rigidly and releasably connecting the frame members, and additional means rigidly and releasably connecting the frame members to the wall body, said devices including demountable and adjustable fastening elements to provide a frame structure capable of receiving wall bodies of various sizes.

2. A glass supporting and forming mold comprising a continuous upright wall body having a curved glass receiving upper edge and being free from inner transverse and longitudinal elements, side frame members of angle iron form disposed at opposite outer sides of the wall body along the lower portions thereof in such manner that the wall body projects thereabove, two end frame members of angle iron form disposed across the end portions of the side frame members and along opposite end portions of the wall body, elements connecting the angle frame members including demountable and adjustable fastening means clamped to the flanges of the frame members to provide a frame structure capable of receiving wall bodies of various sizes, and means for connecting the several frame members to the wall body.

3. A glass supporting and forming mold comprising a substantially continuous upright wall body having a curved glass receiving upper edge and being free from inner transverse and longitudinal structural elements, side frame members disposed at opposite outer sides of the wall body along the lower portions thereof in such position that the wall body projects thereabove, end frame members secured to the end portions of the side frame members and disposed along opposite end portions of the wall body, said frame members having slots intermediate their end portions, and fastening means connected to the wall body, and connected demountably through the slots to the frame members, said frame members constituting a bracing structure surrounding the wall body and forming therewith a rigid glass molding unit.

HENRY J. GALEY.